United States Patent [19]
Jones, Jr.

[11] Patent Number: 5,931,524
[45] Date of Patent: Aug. 3, 1999

[54] LATCH MECHANISM FOR A PIVOTAL DOOR ON A CHILD'S RIDE-ON VEHICLE

[75] Inventor: John L. Jones, Jr., East Aurora, N.Y.

[73] Assignee: Mattel, Inc., El Segundo, Calif.

[21] Appl. No.: 09/014,694

[22] Filed: Jan. 28, 1998

[51] Int. Cl.⁶ .................................................. B60J 5/04
[52] U.S. Cl. ...................... 296/177; 296/146.9; 280/756
[58] Field of Search ................... 296/177, 146.9, 296/146.11; 280/756; D12/83, 87

[56] References Cited

U.S. PATENT DOCUMENTS

| | | |
|---|---|---|
| 4,201,411 | 5/1980 | Morgan . |
| 4,629,023 | 12/1986 | Carpanelli et al. . |
| 4,709,958 | 12/1987 | Harrod . |
| 4,799,708 | 1/1989 | Handa et al. . |
| 5,094,313 | 3/1992 | Mauws . |
| 5,106,150 | 4/1992 | Litwicki . |
| 5,294,153 | 3/1994 | Nolan . |
| 5,409,263 | 4/1995 | Klawitter . |
| 5,570,925 | 11/1996 | Cohen . |
| 5,718,454 | 2/1998 | Harrod ..................................... 280/756 |

Primary Examiner—Gary Hoge
Attorney, Agent, or Firm—Kolisch, Hartwell, Dickinson, McCormack & Heuser

[57] ABSTRACT

A ride-on vehicle for children having a chassis and a plurality of wheels rotatably connected to the chassis, the vehicle further comprising a simulated roll cage attached to the base, the roll cage configured to allow an upper portion of a seated child driver's body to extend above an upper boundary of the roll cage, and a door attached to the roll cage and rotatable about a horizontal axis, the door being configured to allow a driver to enter and exit the vehicle. The roll cage can include a plurality of molded plastic parts assembled in such a manner to resemble an integral framework of interconnected tubing. The door is held in a closed position by a friction fit between the door and the roll cage. The friction fit is disposed at a position above the horizontal axis.

18 Claims, 3 Drawing Sheets

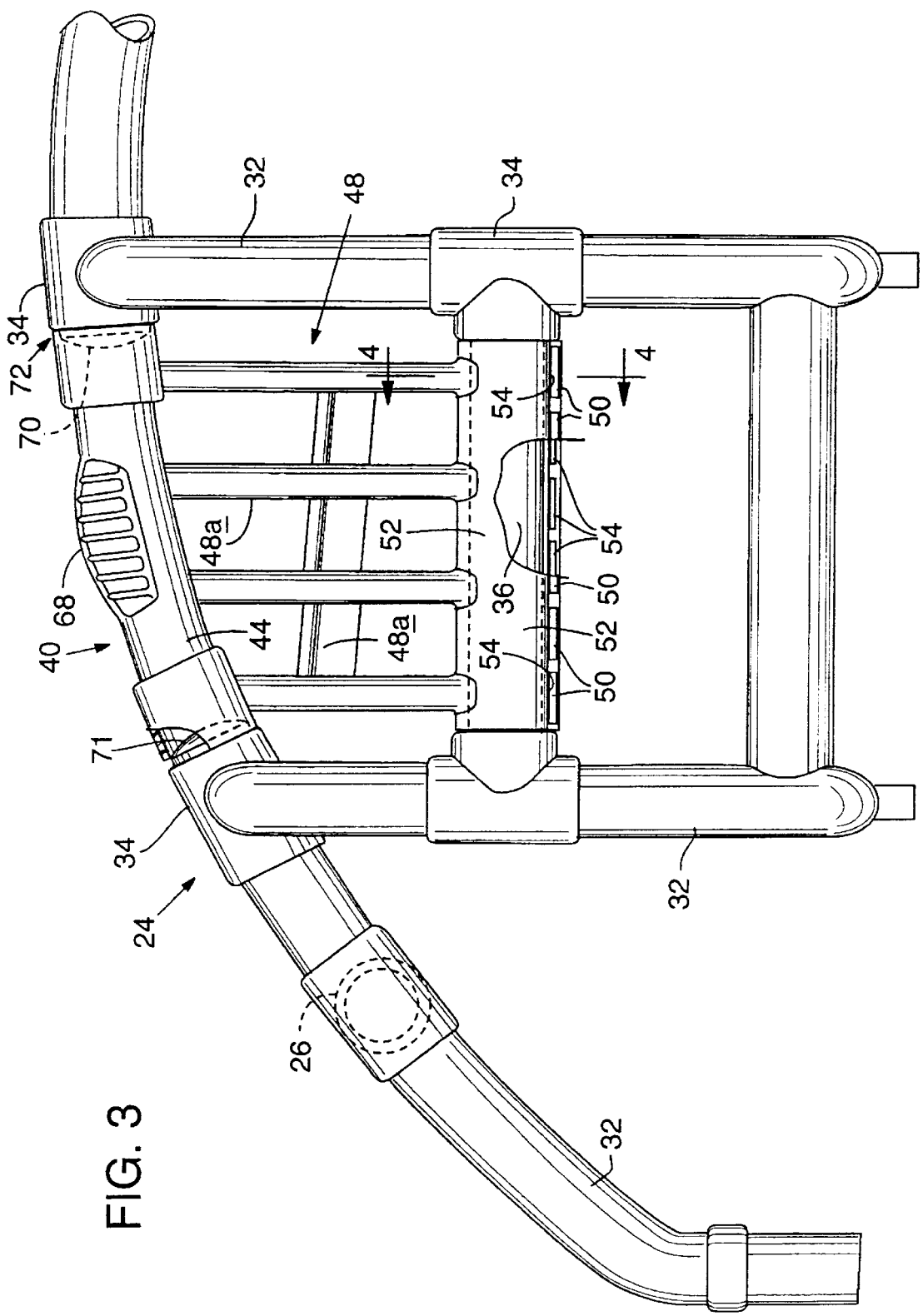

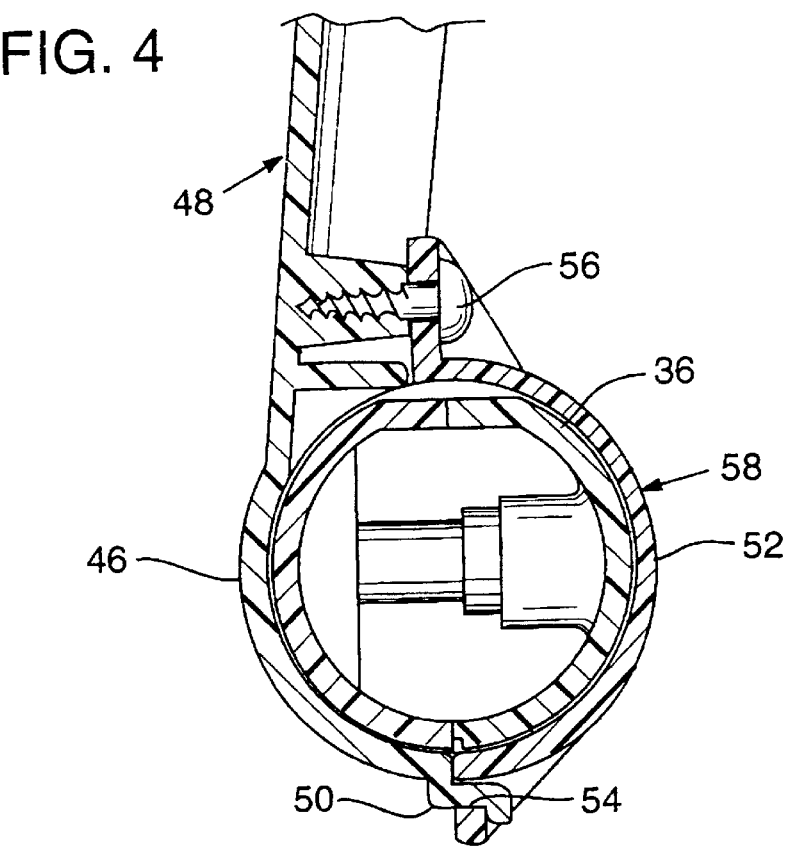
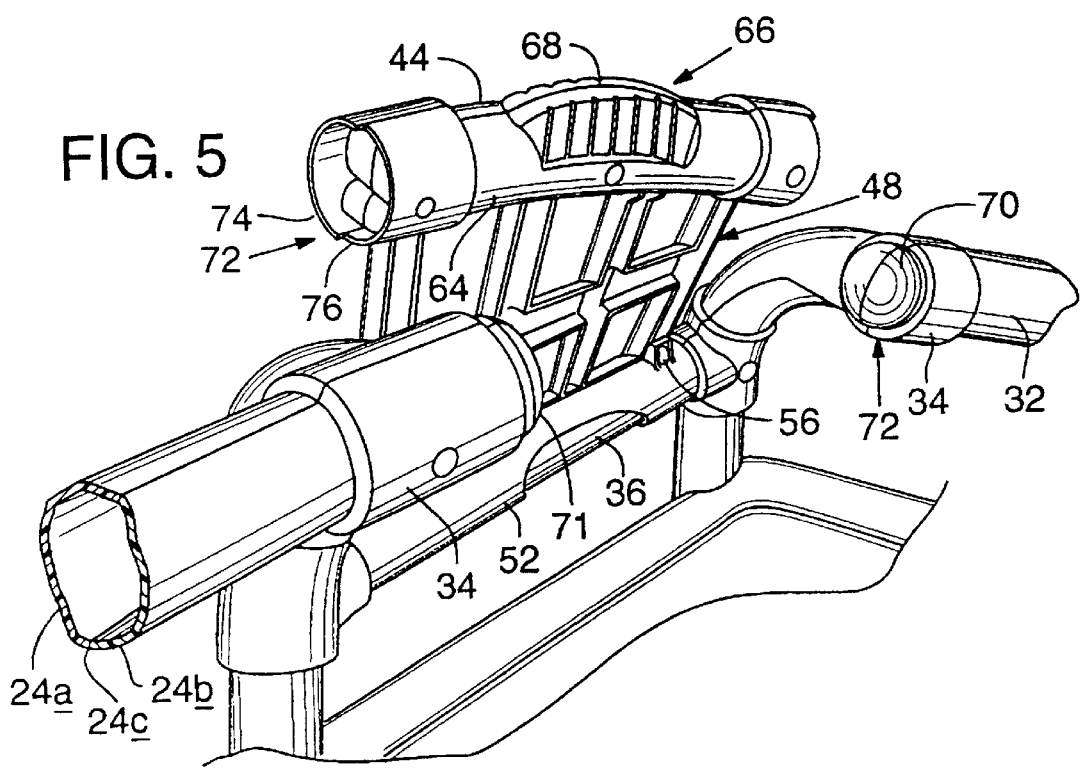

LATCH MECHANISM FOR A PIVOTAL DOOR ON A CHILD'S RIDE-ON VEHICLE

FIELD OF THE INVENTION

The present invention is related to ride-on vehicles for children, and more particularly, to roll cage assemblies on such vehicles.

BACKGROUND OF THE INVENTION

Ride-on vehicles for children have become increasingly popular due in part to the desire of many children to drive self-propelled vehicles resembling full-size vehicles. Such ride-on vehicles are typically self-propelled under battery power and generally include scaled-down features of full-sized vehicles. Many different styles of such reduced-scale vehicles have been produced.

One challenge in designing reduced-scale vehicles is to make the vehicle resemble a full-sized vehicle as closely as possible, while maintaining an appropriate size and cost for a toy vehicle. For example, a reduced-scale convertible-style vehicle may sit low enough to the ground so that a child rider can easily step over the side of the vehicle to enter and exit the vehicle, thus rendering opening side doors unnecessary. On the other hand, while a full-sized dune buggy equipped with a roll cage may have sufficient space between the roll cage bars for a driver to enter and exit the vehicle without the use of a door, this may not be true in a reduced-scale version. In particular, the roll cage on a reduced-scale dune buggy may be difficult for a child to negotiate as he or she attempts to enter and exit the vehicle.

It is therefore an object of the present invention to provide a child's ride-on vehicle having an easily operable door.

It is another object of the present invention to provide a ride-on vehicle for children which has a roll cage that is constructed to visually indicate to the child driver or to a supervising adult the presence of any abnormality, such as an incorrectly closed door.

It is a further object of the present invention to provide a child's ride-on vehicle having a roll cage which resembles a roll cage on a full-size vehicle, but which is adapted for use in a child's vehicle.

SUMMARY OF THE INVENTION

The present invention overcomes these obstacles by providing a ride-on vehicle for children having a chassis and a plurality of wheels rotatably connected to the chassis, the vehicle further including a simulated roll cage attached to the base, the roll cage configured to allow an upper portion of a seated child driver's body to extend above an upper boundary of the roll cage, and a door attached to the roll cage and rotatable about a horizontal axis, the door being operable to allow a driver to enter and exit the vehicle. The roll cage can include a plurality of molded plastic parts assembled in such a manner to resemble an integral framework of interconnected tubing. The door is held in a closed position by a friction fit between the door and the roll cage. The friction fit is disposed at a position above the horizontal axis.

These and other objects, advantages and novel features of the invention will be set forth in part in the description which follows.

BRIEF DESCRIPTION OF THE DRAWINGS

FIG. 3 is a detail view of part of the roll cage of the vehicle in FIG. 1.

FIG. 4 is a cross section view taken through line 4—4 in FIG. 3.

FIG. 5 is a perspective view of part of the roll cage of the vehicle in FIG. 1.

DETAILED DESCRIPTION OF THE PREFERRED EMBODIMENTS

Figure 1:
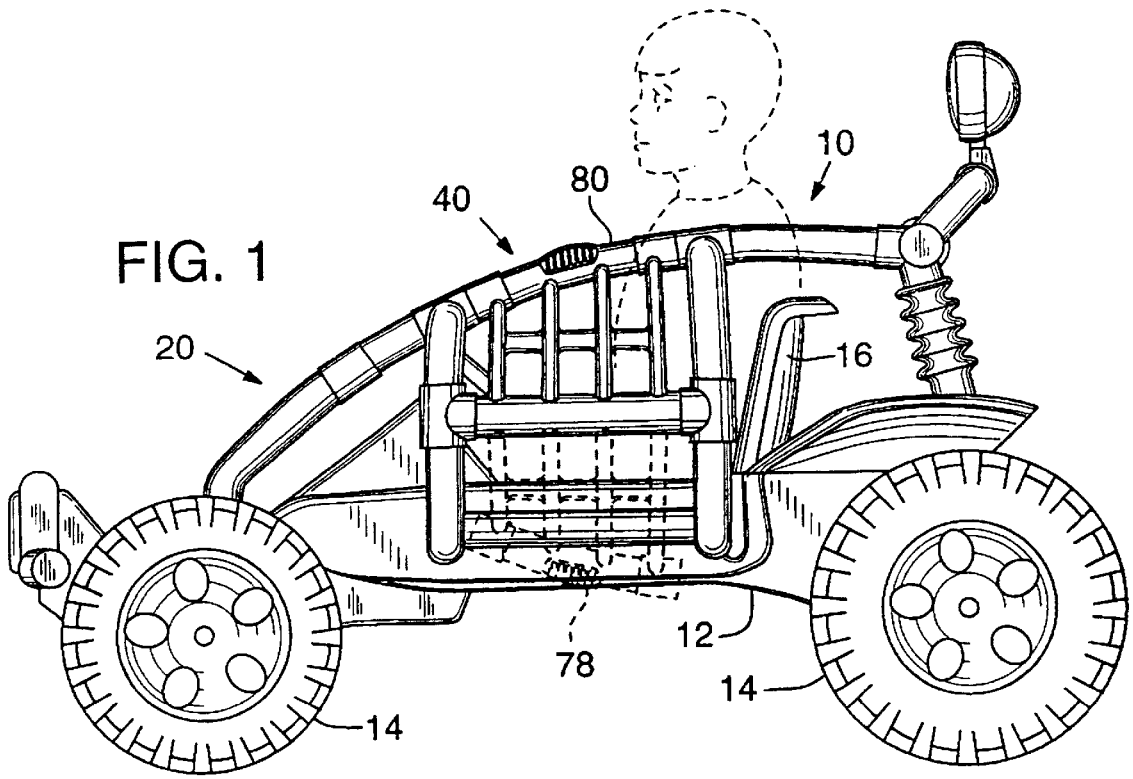
FIG. 1 is a side view of a child's ride-on vehicle according to a preferred embodiment of the present invention.

A ride-on vehicle for children constructed according to the present invention is shown in FIGS. 1–5 and indicated generally at 10. Vehicle 10 can resemble any known type of vehicle, but in the present embodiment resembles an off-road vehicle commonly known as a dune buggy. The vehicle has a chassis 12 upon which is mounted a plurality of wheels 14. A child driver sits on a seat 16 mounted on the body 12. A steering wheel 18 and a pedal 19 allow the child driver to control the steering and the propulsion of the vehicle, respectively.

A roll cage 20 is attached to chassis 12 and forms an upper boundary of the vehicle. Roll cage 20 includes first and second side sections 22, 24 connected by front and rear crossbars 26, 28 such that the roll cage forms a symmetrical appearance as seen from above the vehicle and from each side of the vehicle.

Side section 22 includes two halves 22a, 22b, each of which is integrally molded and formed of plastic. Halves 22a, 22b are joined together at seam 22c and are held together by screws (not shown). Side section 24 is constructed similarly to side section 22 with halves 24a, 24b joined at seam 24c. Fully assembled side sections 22, 24 form an integral, substantially hollow tubing structure. The cross-sectional area of the tubing structure of side sections 22, 24 can vary so that roll cage 20 resembles a roll cage on an actual dune buggy. As shown in FIG. 3, the fully assembled side sections include regions of standard cross-sectional diameter 32, which resemble tube sections. Side sections 22, 24 also include regions of relatively increased cross-sectional diameter 34 which resemble angle joints that connect the tube sections. These different regions 32, 34 create the appearance of a roll cage having a tube-and-joint construction commonly found in full-size dune buggies. It is possible for side sections 22, 24 to be formed of individual hollow tubes interconnected by joint connectors. Roll cage 20 is built so that the upper portion of a child driver's body extends upwardly beyond the upper boundary of vehicle 10 as defined by side sections 22, 24. Roll cage 20, made of molded plastic components, therefore only simulates a roll cage found on an actual dune buggy.

Figure 2:
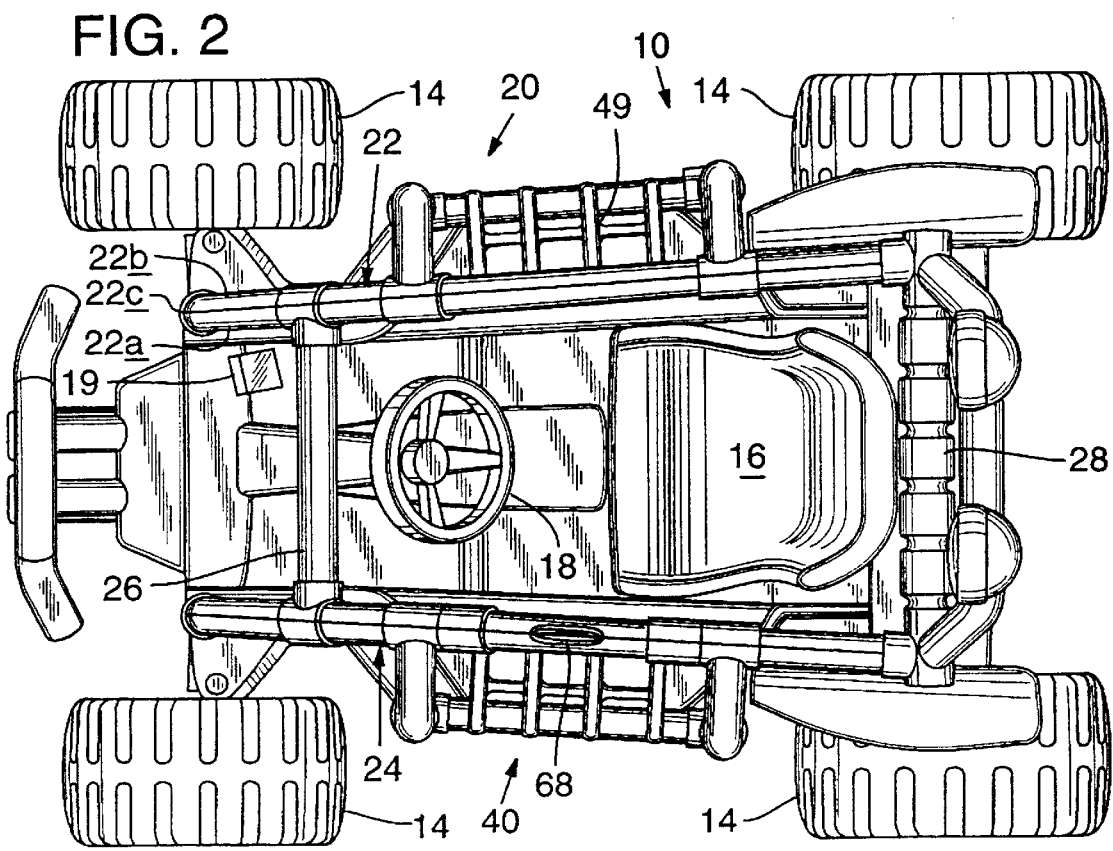
FIG. 2 is a plan view of the vehicle in FIG. 1.

Second side section 24 includes a substantially horizontally disposed roll cage hinge tube 36. Second side section 24 has a door 40 forming part of the symmetrical appearance of roll cage 20. Door 40 includes a main portion 42 having a first handle half 44 and a first hinge half 46 connected by a lattice structure 48. A plurality of tabs 50 are arranged at the lowest point of first hinge half 46. Second hinge half 52 has a plurality of slots 54 into which tabs 50 fit. Slots 54 and tabs 50 form a connecting structure that holds first and second hinge halves 44, 52 together in their assembled condition. Screws 56 further hold together the first and second hinge halves. The first and second hinge halves form a door hinge tube 58 that surrounds roll cage hinge tube 36. As shown in FIG. 4, a clearance is provided between the outer surface 60 of roll cage hinge tube 36 and the inner surface 62 of door hinge tube 58 such that door hinge tube 58 is rotatable with respect to roll cage hinge tube 36. Lattice structure 48 includes a series of intersecting members 48a designed to simulate safety netting commonly found on windows of conventional dune buggies and racing cars. As shown in FIG. 2, a corresponding lattice structure 49 is found on first side section 22. Lattice structures 48, 49 can be made of any suitable material, but for economy of manufacture they are preferably integrally molded with door 40 and first side section, respectively.

First handle half 44 mates with second handle half 64 to form a handle tube 66. The handle tube includes a handle portion 68 that has a reduced width relative to the diameter of handle tube 66. The handle tube connects to side section 24 adjacent regions of increased cross-sectional diameter 34 on side section 24. Knobs 70, 71 are disposed on side section 24 adjacent handle tube 68 when door 40 is in a closed position.

Rims 72, 73 are positioned on both ends of handle tube 68. As shown in FIG. 5, rim 72 extends in a direction away from handle tube, with the outside portion 74 of the rim extending further away from handle tube than the inside portion 76 of the rim. Rim 72 surrounds knob 70 when door 40 is in the closed position, creating a friction fit between rim 72 and knob 70. Rim 73 and knob 71 are constructed in a manner similar to rim 72 and knob 70, respectively, and a similar friction fit is provided therebetween. These friction fits should be designed to allow a child driver to open and close door 40 without undue effort. Rims 72, 73 and knobs 70, 71 thus create a door latch mechanism operable to hold door 40 in the closed position.

To open door 40, a user pulls handle tube 68 outward with sufficient force to overcome the friction fit between rims 72, 73 and knob 70, 71. Door 40 is rotatable about roll cage hinge tube 36 until the door moves to the position shown at 78 in FIG. 1. The child enters the vehicle and swings the door upward to the closed position shown in dashed lines at 80 in FIG. 1. The door is pulled inward with sufficient force to overcome the friction fit between rims 72, 73 and knobs 70, 71. Once door 40 is closed, the increased length of the outside portion 74 of the rim prevents the door from rotating into the driver compartment.

It can thus be seen that the ride-on vehicle of the present invention presents a user with a visually appealing, symmetrical roll cage having a door forming part of the roll cage. Further, the symmetry of the roll cage enhances the safety of the vehicle. Because the sides of roll cage are nearly identical, a quick visual inspection is all that is required to determine if the door is not completely shut or if any abnormalities are present in the roll cage construction.

The foregoing description of the preferred embodiments of the invention has been presented for purposes of illustration and description. It is not intended to be exhaustive or to limit the invention to the precise form disclosed, and many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A ride-on vehicle for children having a chassis with seat and a plurality of wheels rotatably connected to the chassis, the vehicle further comprising:

a simulated roll cage attached to and projecting upwardly from the chassis around the seat, the roll cage having an upper opening through which an upper portion of a child driver's body will project when the child is positioned in the seat; and a door attached to the roll cage and bounding at least part of the upper opening, the door being rotatable about a horizontal axis to provide a selectively openable entry path to allow the driver to enter and exit the vehicle.

2. The ride-on vehicle of claim 1, wherein the roll cage includes a framework of interconnected plastic tubes.

3. The ride-on vehicle of claim 2, wherein the tubes are interconnected at least in part by being integrally molded.

4. The ride-on vehicle of claim 2, wherein the tubular framework has a plurality of regions of increased cross-sectional area.

5. The ride-on vehicle of claim 4, wherein the door is friction fit to the framework adjacent one of the regions of increased cross-sectional area.

6. The ride-on vehicle of claim 1, wherein the roll cage includes a plurality of molded plastic parts configured to resemble an integral framework of interconnected tubing.

7. The ride-on vehicle of claim 1, wherein the door is held in a closed position by a friction fit between the door and the roll cage.

8. The ride-on vehicle of claim 1, wherein the roll cage includes a first roll cage tube, and wherein the door includes a first door tube pivotally mounted to the first roll cage tube, the vehicle further comprising a latch mechanism which provides a friction fit between the door and the roll cage, the latch mechanism releasably holding the door in a closed position.

9. The ride-on vehicle of claim 8, wherein the latch mechanism comprises:

an abutment positioned on one of the door and the roll cage; and a rim structure positioned on the other of the door and the roll cage, the rim structure being adjacent the abutment when the door is in the closed position.

10. The ride-on vehicle of claim 8, wherein the latch mechanism includes a stop configured to prevent the door from pivoting in one direction when the door is in the closed position.

11. The ride-on vehicle of claim 8, wherein the friction fit is located at a point above the horizontal axis.

12. The ride-on vehicle of claim 1, wherein the door rotates in a downward direction when the door is opened.

13. The ride-on vehicle of claim 1, wherein the roll cage forms a symmetrical appearance.

14. The ride-on vehicle of claim 13, wherein the roll cage has two sides, and wherein the door is situated on one of the sides, the door in the closed position forming part of the symmetrical appearance.

15. The ride-on vehicle of claim 1, wherein the door comprises:

a main portion having a first hinge component; and a second hinge component connected to the first hinge component such that the first and second hinge components are pivotable with respect to the roll cage.

16. The ride-on vehicle of claim 15, wherein the first and second hinge components are connected by a connecting structure, the connecting structure including a slot, and a tab designed to fit in the slot when the first and second hinge components are fit together.

17. A simulated roll cage for a ride-on vehicle for children, the roll cage comprising:

a framework of interconnected plastic tubes including a first roll cage tube, the framework being configured to allow an upper portion of a child driver's body to extend above the framework;

a door attached to the framework, wherein the door includes a first door tube pivotally mounted to the first roll cage tube; and a latch mechanism providing a friction fit between the door and the framework, the latch mechanism releasably holding the door in a closed position.

18. A ride-on vehicle for children having a chassis and a plurality of wheels rotatably connected to the chassis, the vehicle further comprising:

a roll cage attached to the chassis, the roll cage including a plurality of molded plastic parts configured to resemble an integral framework of plastic tubing forming a symmetrical appearance, the roll cage also including a first roll cage tube;

a door including a first door tube pivotally mounted to the first roll cage tube such that the door is rotatable, with respect to the roll cage, about a horizontal axis, the door rotating in a downward direction when opened and configured to allow a driver to enter and exit the vehicle; and a latch mechanism positioned above the horizontal axis and including an abutment positioned on one of the door and the roll cage, a rim structure positioned on the other of the door and the roll cage, the rim structure being adjacent the abutment when the door is in a closed position, and a stop configured to prevent the door from pivoting in one direction when the door is in the closed position, the latch mechanism providing a friction fit between the door and the roll cage, thereby releasably holding the door in a closed position.

* * * * *